United States Patent [19]

Barlow et al.

[11] Patent Number: 5,678,162

[45] Date of Patent: Oct. 14, 1997

[54] MOLD USEFUL FOR INJECTION MOLDING OF PLASTICS, AND METHODS OF PRODUCTION AND USES THEREOF

[75] Inventors: Joel W. Barlow; Balasubramanian Badrinarayan; Joseph J. Beaman; David L. Bourell; Richard H. Crawford; Harris L. Marcus, all of Austin, Tex.; James R. Tobin, Forest Park, Ohio; Neal K. Vail, Ulm/Mahringen, Germany

[73] Assignee: Board of Regents, Univ. of Texas System, Austin, Tex.

[21] Appl. No.: 339,988

[22] Filed: Nov. 14, 1994

[51] Int. Cl.⁶ ............................................. B22F 1/00
[52] U.S. Cl. ........................ 419/2; 419/19; 419/27; 419/37; 419/45; 419/54; 419/57; 264/219
[58] Field of Search ........................... 264/7, 44, 59, 264/82, 219, 255, 497; 419/2, 10, 19, 22, 27, 36, 37, 38, 44, 45, 54, 56, 57, 65, 66

[56] References Cited

U.S. PATENT DOCUMENTS

| | | | |
|---|---|---|---|
| 3,755,213 | 8/1973 | Kendall et al. | 260/2.5 EP |
| 4,464,485 | 8/1984 | Kishima et al. | 521/64 |
| 5,021,213 | 6/1991 | Nishio et al. | 419/36 |
| 5,061,427 | 10/1991 | Hirzel | 264/219 |
| 5,284,695 | 2/1994 | Barlow et al. | 428/206 |

OTHER PUBLICATIONS

Tobin et al., "Indirect Metal Composite Part Manufacture Using teh SLS Process", Solid Freeform Fabrication Symposium Processings, The University of Texas, Austin, Texaz. pp. 303–307 1993.

Badrinarayan et al., "Selecrive Layer Sintering of a Copper–PMMA System", Solid Freedom Fabrication Symposium Proceedings, pp. 141–146 1992.

*Primary Examiner*—David W. Wu
*Attorney, Agent, or Firm*—Arnold, White & Durkee

[57] ABSTRACT

A mold useful for injection molding, comprising: a porous network of metal and oxidized metal and a cured epoxy resin dispersed in the porous network. The mold can be prepared by a process comprising the sequential steps of (a) forming a mixture of a metal powder and a polymer binder; (b) heating the mixture at a temperature in the range from about 100° C. to about 300° C. to remove a majority of the polymer binder from the mixture; (c) heating the mixture resulting from step (b) at a temperature greater than about 300° C. and less than the melting point of the metal in the presence of oxygen to oxidize at least a portion of the metal to form a self-adhering porous network of metal and oxidized metal; (d) contacting the self-adhering porous network with an epoxy resin to fill at least a portion of the porous network with epoxy resin; and (e) curing the body resulting from step (d) to form the mold. The shape of the mold can be performed by selective laser sintering of the mixture.

11 Claims, No Drawings

MOLD USEFUL FOR INJECTION MOLDING OF PLASTICS, AND METHODS OF PRODUCTION AND USES THEREOF

BACKGROUND OF THE INVENTION

This invention relates to molds useful for injection moldings of plastics. This invention also relates to methods of manufacturing molds. This invention also concerns methods of injection molding plastics.

Molds to be used for the injection molding of thermoplastics are traditionally manufactured from cast metal by precision metal cutting devices. The machining and polishing times are quite extensive and the cost are correspondingly high. These high costs and production times effectively preclude the preparation of prototype plastic parts by injection molding. Prototype plastic parts are consequently usually manufactured by other processes. Unfortunately, the properties of such parts may not be truly representative of those of injection molded parts due to the thermal stresses and molecular orientation inherent to the injection molding process.

Accordingly, there is a great need for low cost, low production time molds which could produce the 50 to 500 plastic parts needed to prove a design. In addition to cost and time savings, it is desirable to have a process to produce molds which incorporate custom cooling channels and other features of a mold not easily machined, ease of manufacture of duplicate molds, opportunity to evaluate the prototype system prior to machining a production mold and ease of cavity design by use of commercial solid modelers. In addition, the prototype mold should have minimal and predictable shrinkage from the original design and sufficient strength for withstanding injection pressures and temperatures.

Previously, some types of prototype molds were prepared by forming an admixture of metal powder or flakes in combination with a resin such as an epoxy resin. The admixture was then cured to harden the epoxy resin and thereby produce the final mold. Unfortunately, individual metal powders are substantially separated from one another and surrounded by the epoxy resin; consequently, the metal powder is not in contact such that thermal conductivity of the final piece is far less than the thermal conductivity of metal alone. It is desirable for molds to have reasonable levels of thermal conductivity so that heat from the plastic injected into the mold can be readily dissipated so that the molten plastic hardens rapidly.

A solution to the problems described above is desirable.

SUMMARY OF THE INVENTION

In one respect, this invention is a mold useful for injection molding, comprising: a porous network of metal and oxidized metal, and a cured epoxy resin dispersed in the porous network.

In a second respect, this invention is a process useful for the manufacture of a mold useful for injection molding, comprising the sequential steps of: (a) forming a mixture of a metal powder and a polymer binder; (b) heating the mixture at a temperature in the range from about 100° C. to about 300° C. to remove a majority of the polymer binder from the mixture; (c) heating the mixture resulting from step (b) at a temperature greater than about 300° C. and less than the melting point of the metal in the presence of oxygen to oxidize at least a portion of the metal to form a self-adhering porous network of metal and oxidized metal; (d) contacting the self-adhering porous network with an epoxy resin to fill at least a portion of the porous network with epoxy resin; and (e) curing the body resulting from step (d) to form the mold.

This invention, in a third respect, is a process of producing molded plastic, comprising injecting molten plastic into a mold, the mold comprising a porous network of metal and oxidized metal and a cured epoxy resin dispersed in the porous network.

Molds prepared according to the practice of the present invention generally possess higher thermal conductivity as compared to molds prepared by admixing a metal and an epoxy resin directly, followed by curing to form the final mold. The molds produced in accordance with the present invention are composed of a porous network formed by partial oxidation of the metal. The porous network self-adheres such that the porous network has good strength and generally has a modulus of rupture on the order of about 1,000 to about 2,500 pounds per square inch ("psi"). Infiltration of the self-adhering porous network with epoxy resin can produce a final composite mold with strength near 10,000 psi. The molds prepared in accordance with this invention are easily prepared and possess good strength and improved thermal conductivity. Thus, the molds of the present invention are advantageously useful as prototype molds and mold inserts.

DETAILED DESCRIPTION OF THE INVENTION

The molds of the present invention are manufactured in accordance with the process described hereinabove. In step (a) of the process, a mixture of a metal powder and a polymer binder is formed.

The metal powders used in the practice of this invention are varied, but must be capable of forming a self-adhering oxide when oxidized in an oxygen containing atmosphere at temperatures below the melting point of the metal. Representative examples of suitable metal powders include iron, mild steel, and copper. As used herein, "powder(s)" means particulates having an average diameter less than about 200 microns.

The polymer binder used in the present invention has a relatively low softening temperature, above room temperature but below 100° C. (or below a spray dryer exit temperature). Typically, polymer binders used in the practice of this invention contain styrene, methyl methacrylate, butyl acrylate or mixtures thereof. Representative examples of such polymer binders include a copolymer containing styrene, methyl methacrylate, butyl acrylate and methacrylic acid monomers (for example, such a polymer is sold commercially from Union Carbide under the tradename UCAR-430), poly(styrene-methacrylic acid, methyl methacrylate, butyl methacrylate, butyl acrylate) polymer as well as other polymers of methyl methacrylate and butyl acrylate. The polymer binder amounts to about 15 percent by weight of the mixture of metal powder and polymer binder, however, the amount of polymer binder can vary from 10 to 40 percent by weight.

The mixture of metal powder and polymer binder can be formed by any method which evenly distributes the polymer binder and metal powder. For instance, the mixture can be formed by simple stirring of the two components. Preferably, the mixture is formed using the procedure described in U.S. Pat. No. 5,284,695, incorporated herein by reference. This procedure entails making a slurry of metal powder and the polymer binder, the polymer binder being added as an aqueous emulsion. Next, the slurry is sent to a conventional spray dryer for spray drying into a powder. As a result of spray drying, the metal powder is agglomerated with the polymer binder to form particles which can be formed into a mass to be used directly as the mixture in the process of this invention, or which is shaped by either packing into a mold or by selective laser sintering described hereinbelow. The particle sizes will range in size depending on the size of the starting metal powder. Generally, the particles produced have a diameter two to three times that of the original metal powder.

In selective laser sintering, a laser is scanned in raster fashion over a layer of fusible powder to fuse selected portions of the layer according to a cross section of the desired part. After the fusing of the desired portions of a layer, another layer of powder is placed and similarly selectively fused to itself, with fused portions of the latter layer.

Continued layer wise processing in this manner results in a part which can be quite complex in the three dimensional sense. This method is described in detail in U.S. Pat. No. 5,076,869 and U.S. Pat. No. 4,944,817. The selective laser sintering method is also described in U.S. Pat. No. 4,863, 538; U.S. Pat. No. 5,017,753 and U.S. Pat. No. 4,938,816. As stated above, the particles can be formed into a shape in a mold or can be shaped using selective laser sintering. Selective laser sintering is also referred to in U.S. Pat. No. 5,284,695.

In step (b) of the process of the present invention, the mixture is next heated at a temperature in the range of about 100° C. to about 300° C. The heating proceeds for a time sufficient to remove at least a majority of the polymer binder. At these temperatures, the polymer binder is readily removed from the mixture. The polymer can be said to "debound" from the mixture. Preferably, at least 90 percent by weight of the polymer binder is removed from the mixture during this step. This first heating step can be performed with or without the presence of oxygen. In one embodiment of this invention, the first heating step (b) is conducted in the presence of nitrogen. As one of skill in this art appreciates, the heat is slowly increased to limit the possibility of fracturing which might otherwise occur due to the build-up of internal pressure when gases generated in the mixture from debonding of the polymer binder or from water or both during heating do not have time to exit the mixture. Further, increasing size of the mixture, or increasing thickness, generally has greater potential for fracture. This first heating step can be performed in an oven of simple design, such as a muffle furnace.

Likewise, the second heating step (c), at a temperature greater than about 300° C. and less than the melting point of the metal, can also be performed in an oven of simple design. In this second heating step (c), an oxygen containing gas, usually air, is required during the heating so that the metal is at least partially oxidized. The amount of oxidation can be varied by adjusting the amount of oxygen in the oven or by adjusting the length of time and temperature of heating. In the practice of this invention, metals are selected which self adhere when oxidized. Thus, during heating step (c), oxidation of the metal forms a self-adhering porous network, such that the porous network maintains its shape on handling. For iron, steel and copper, the second heating step (c) is conducted at a temperature less than about 600° C. In one embodiment of the invention, greater than about 5 percent and less than about 95 percent of the metal is oxidized, based on the total amount of metal present. Typically, the modulus of rupture for the porous network is at least about 1000 psi as measured by three point bending. Consequently, the porous network can be readily handled.

The porous network is then contacted in step (d) with an epoxy resin to fill at least a portion of the void space in the porous network with the epoxy resin. In addition to epoxy resin, hardening agents and accelerators well known to those skilled in the art can also be added during this step to facilitate curing in step (e). For example, an epoxy resin system containing 100 parts of epoxy resin, 80 parts of methyl anhydride hardener and one part benzyl dimethyl amine accelerator can be employed. The epoxy resin can be easily contacted with the porous network by painting or by immersing the porous network in the epoxy resin. In a preferred embodiment, the porous network is contacted with epoxy resin by placing the porous network in a pool of epoxy resin whereby the epoxy resin infiltrates the porous network by capillary action. Advantageously, commercially available epoxy resin has been found to infiltrate at least about 95 percent of the porous volume, and in some instances infiltrate over about 98 percent of the porous volume. Epoxy resins used in the practice of this invention have the following properties: (1) the epoxy resins adhere to and wet metal oxides by capillary action, the epoxy resins capable of a 3 centimeter capillary rise; (2) the epoxy resins have a system viscosity of about 40 centipoise at 80° C.; (3) the cured resins have softening temperatures greater than 150° C.; and (4) the cured resins have a tensile strength in the range of 10,000 psi. Typically, epoxy resins used herein are based on bisphenol A. Representative examples of a preferred epoxy resin used in the practice of this invention is the reaction product of bisphenol A and epichlorohydrin (for instance, an epoxy resin sold commercially by The Dow Chemical Company under the tradename DER 331, which has the following properties: an uncured resin viscosity at 25° C. of 11,000 to 14,000 centipoise and of 38 centipoise at 80° C.; the cured resin has heat distortion temperature of 156° C., a tensile strength of 10,000 psi; flexural strength of 14,000 psi and flexural modulus of $4.4 \times 10^5$ psi). Examples of commercially available epoxy resins useful in the practice of this invention also include a resin sold under the tradename Duralco 4460 by Cotronics Corporation and an epoxy resin sold under the tradename Insulcast 771 by Permagile Industries. A representative example of a hardener is nadic methyl anhydride. A representative example of a useful accelerator is benzyl dimethyl amine.

In step (e), the body resulting from contacting the epoxy resin with the porous network is cured to harden the epoxy resin. The curing step can be carried out by methods well known to those skilled in the art. Typically, the resulting body is heated at a temperature in the range from about 50° C. to about 200° C., preferably, from about 100° C. to about 150° C. for a sufficient length of time such that the epoxy resin hardens. It should be recognized that the curing temperature can vary depending on the type of resin and/or epoxy resin system employed. Typically, the curing step is carried out from about 1 hour to about 6 hours, depending on the type of epoxy resin. In one embodiment of this invention, the final mold has a three point bending modulus of rupture of greater than 2500 psi. In another embodiment, the mold is composed of greater than 10 volume percent and less than about 90 volume percent of the cured epoxy resin.

The final mold produced by the process described above can be used in injection molding if the shape has been previously defined. Alternatively, the final mold can be machined by methods well known to those skilled in the art to form the final shaped mold useful in injection molding. The final mold has a coefficient of thermal expansion which will vary depending on the type of metal used, the extent of oxidation of the metal and the type of epoxy resin used. A mold composed of 38 percent by volume copper has a thermal conductivity of about 0.8 watt/m° C. while a mold composed of 48 percent by volume iron has a thermal conductivity of about 1.47 watt/m° C. It should be appreciated that metal oxides do not possess the relatively high thermal conductivity of corresponding metals per se. It is contemplated that by adjusting the amount of oxidation in heating step (c), an optimal amount of oxidation can be carried out through routine experimentation so the resulting porous network has an adequate amount of strength yet retains high levels of thermal conductivity of unoxidized metal in the porous network.

The molds prepared in accordance with this invention can be used in injection molding applications. Accordingly, in the fourth aspect of this invention, the mold is mounted in a conventional injection molding apparatus, optionally sprayed with a mold release agent such as a silicone spray, followed by injection of the molten thermoplastic of interest into the mold. The molten plastic is then allowed to cool so that it hardens thereby enabling its removal from the mold as a final shaped article. This and other injection molding procedures are well known to those skilled in the art. Representative examples of such thermoplastics include polycarbonate, acrylonitrile-butadiene-styrene ("ABS"), polyester, polystyrene, polyethylene, polypropylene and poly(methyl methacrylate).

The following examples are provided to further illustrate the invention and should not be construed to limit the scope of the invention or claims thereto.

As used in the examples, "PC" means polycarbonate, "ABS" means acrylonitrile-butadiene-styrene and "PMMA" means poly(methyl methacrylate). In Example 9, the copolyester used was purchased from Eastman Chemical under the tradename Kodar A150.

EXAMPLE 1

Starting Metals

The metal powders used are −325 mesh (<44 μm) iron powder, (ANCOR ATW 230), manufactured by Hoeganaes Corporation, Div. of Interlake Company, Riverton, N.J., and copper powder, also −325 mesh, supplied by Reade International Company, 45 W. River Road, Rumson, N.J. The average particle size in these materials is about 5 μm.

EXAMPLE 2

Preparation of Polymer Binder

Polymer emulsions are prepared following N. K. Vail and J. W. Barlow, *Universal Binder Compositions for Selective Laser Sintering*, U.S. patent application Ser. No. 08/279, 325, Jul. 22, 1994, now abandoned and N. K. Vail, et al., "Development of a Poly(methyl methacrylate-co-n-butyl methacrylate) Copolymer Binder system," *J. Appl. Polym. Sci.*, 52:789–812 (1994). The present example uses t-dodecyl mercaptan chain transfer agent (CTA) to reduce molecular weight and viscosity of the binder to values suitable for selective laser sintering processing. In this example, 2.2 g of sodium dodecyl sulfate and 3.4 g of 1N NaOH solution are added to 600 ml of water. 10 g of potassium persulfate initiator are added to the water and the mixture is heated to 70°–75° C. with continuous mixing on a one liter reactor. 10.7 g of CTA is added to 300 ml of methyl methacrylate (MMA) monomer, density of 0.936 g/ml, to prepare a 3.68% concentration of CTA. The monomer mixture is added with stirring to the water phase after the water has come to the desired temperature. The multiphase mixture is stirred and heated for 3–4 hours to form an emulsified mixture of PMMA in water. A portion of the polymer is recovered from the emulsion by precipitating it with acetone, following the procedure set forth in Vail, et al. Following the protocol of ASTMD 1238, this PMMA is found to have a Melt Flow Index at 200° C. and 75 psi of 15.6 g/10 min.

EXAMPLE 3

Formation of polymer-coated copper particles

Polymer coated particulate is prepared by spray-drying a slurry of the emulsion-polymer binder with the metal particles. Because metal particles are quite dense (8.91 g/ml is the density of copper), they tend to rapidly settle out from the low viscosity emulsion slurry. This leads to clogging of feed lines to the spray dryer. For this reason small quantifies of viscosity-enhancing, water-soluble polymers are added such as polyethylene glycol, xanthan gum or acacia gum. In the present example 0.1% xanthan gum was used to provide a viscosity near 4.36 centipoise. This viscosity is found to be sufficient to prevent settling in the equipment used.

For example, 1000 g of 5 μm copper powder are coated with PMMA emulsion that contains 45% PMMA solids. For good atomization and drying, the feed stream to the spray dryer needs to contain 50% solids. The volume fraction polymer coating on the dried and coated copper powder is desired to be 25 percent by volume. The weight fraction of polymer on the copper is calculated to be (1.19 g/ml is the density of PMMA) 0.0426. 1.089 g of xanthan gum is added to 990.1 g water to achieve a viscosity of 4.36 centipoise. Once the xanthan gum is dissolved, 98.93 g PMMA emulsion is mixed with water solution. This mixture is well stirred while 1000 g of 5 μm copper is gradually added. Agitation is continued thereafter to prevent the slow settling of copper particles.

The stabilized slurry of copper and polymer binder is fed to a spray dryer (Anhydro Laboratory Model I), operated using a 250°–260° C. inlet air temperature. The feed rate, approximately 50 g/min, was adjusted to keep the exit air temperature between 138°–150° C., to facilitate fusion of the PMMA binder. The PMMA binder has a softening temperature of 106° C. The 2.5 inch outside diameter atomizer wheel is typically operated near 35,000 RPM to produce droplets that, when dried, form 10–30 μm, agglomerated and coated particles.

EXAMPLE 4

Formation of binder powder

Small batches of mixed powders of metal and polymer binder can be prepared by simply mixing the powders in a blender or by shaking them together in a closed container. For this purpose, the binder emulsion can be spray dried directly. Typical dryer conditions are 150° C. inlet temperature, 90° C. exit temperature, 50 g/min feed rate. The binder was usually atomized with a 2.5 inch outside diameter atomizer wheel in which are placed four 2 mm diameter nozzles, operated at 25,000 RPM. Typical particle sizes were 14–20 μm.

EXAMPLE 5

Shape formation by Selective Laser Sintering

For purposes of preparing material suitable for rapid molds by selective laser sintering, 40 volume percent poly (methyl methacrylate-co-butyl methacrylate) polymer binder, prepared according to Vail, et al., and spray dried according to the conditions described in Example 4, above, was mixed with 60 volume percent iron powder. This mixture was processed in a selective laser sintering machine.

Test bars made from the same material at the same conditions had bending strengths in the green state between 400 and 500 psi and densities between 51.5 and 53 percent of theoretical.

EXAMPLE 6

Debinding and Oxidation

In contrast to conventional metal sintering processes that require reducing atmospheres and chemical fluxing agents to ensure removal of metal oxide, a major impediment to sintering, the present process encourages the formation of metal oxide.

A mixture of 40 volume percent polymer binder with 60 volume percent iron powder is prepared according to Examples (1,2,4, and 5) above. The resulting green mold shapes are thermally debonded and oxidized by placing them, unsupported, in a laboratory box furnace (Model 51894, Lindberg, Watertown, Wis.) that is slowly heated to 300° C., held at that temperature 16.5 hours to ensure thermal decomposition of the binder, followed by heating to 400° C. and holding for one hour. The bending strength of test bars that were prepared under identical conditions were found to be 1500 psi.

Linear dimensions of test bars prepared under similar conditions were seen to increase up to 4.4 percent relative to unfired dimensions after firing. This contrasts with the usual decrease in dimensions that occur during conventional debonding and sintering in reducing atmospheres. Mold part dimensions, both increased and decreased, depending on the measurement direction.

Iron test bars that are debonded and oxidized according to the generalized cycle shown in Table 1 show somewhat more complex behavior. As the maximum firing temperature is increased, the relative fired density of the part increases. The actual linear shrink rates in the length (nominal 3 inch), width (nominal 1 inch), and thickness (nominal 0.25 inch) directions in the test bar are seen, to always to be highest in the part-build (thickness direction). This is probably a consequence of additional porosity in that direction that is associated with the layers put down by the selective laser sintering machine. The x-y dimensions within each layer show negative shrinkage or increases in dimensions as a result of the firing cycle.

TABLE 1

Oxidation Cycle to Study Effect of Maximum Firing Temperature on Part Strength

| Furnace Setpoint (°C.) | Time (Hours) |
| --- | --- |
| 200 | 5 |
| 300 | 1 |
| 400 | 1 |
| 500 | 1 |
| Max temp | 4 |

Maximum growth in dimensions occurs when maximum firing temperatures near 450° C. are employed. This firing temperature also yields bars with the highest bend strength, near 2500 psi. X-ray analysis of the fracture surfaces of fired iron parts show the formation of both $Fe_2O_3$ and $Fe_3O_4$ at temperatures above 300° C. The maxima in strengths and densities at 400° C. appear to relate to a 60 $Fe_2O_3$/30 $Fe_3O_4$/10 Fe relative surface composition. Formation of oxide is apparently related to the increased strength of the bars that are fired at temperatures greater than 300° C., however conversion of the oxide from $Fe_3O_4$ to $Fe_2O_3$ at firing temperatures greater than 400° C. leads to decreased strength of the fired bars.

EXAMPLE 7

Epoxy resin infiltration

Several commercially available epoxy resins were evaluated as infiltrants for the air-fired iron and copper shapes described above. The criteria for material selection are: (1) resin viscosity should be less than 100 centipoise at infiltration temperature to permit rapid infiltration through the pores of the air-fired part; (2) the resin should cure to have good mechanical properties and high softening temperature, preferably in excess of 150° C.; (3) the curing system should have a gel time greater than one hour at the temperature of infiltration to permit sufficient infiltration time, and (4) the resin and metal oxides should adhere well to permit achieve good composite strengths.

A summary of epoxy infiltrants, strengths and relative densities of infiltrated iron bars, and qualitative comments are summarized in Table 2. In Table 2, "RBC 3100" is the tradename of an epoxy resin sold by RBC Industries, Inc. which has a viscosity of 1200 centipoise at 25° C., a thermal distortion of 125° C. and a tensile strength of 12,000 psi; "Duralco 4460" is the tradename of an epoxy resin sold by Cotronics Corporation, having a viscosity of 600 centipoise at 25° C., a heat distortion of 260° C. and a tensile strength of 10,300 psi; "DER 331" is the tradename of an epoxy resin sold be The Dow Chemical Company, its properties described above; "Insulcast 771" is the tradename of an epoxy resin sold be Permagile Industries, having a viscosity of 700 centipoise at 25° C., a heat distortion of 140° C. and a tensile strength of 8,700 psi; "CGL 1310" is the tradename of an epoxy resin sold by Ciba-Geigy Corporation having a viscosity of 7,000 centipoise at 25° C., a heat distortion of 230° C. and tensile strength of 6000–8000 psi; and "LS 213-10" is the tradename of an epoxy resin sold by Mavidson having a viscosity of 1200 centipoise at 25° C., heat distortion of 120° C. and tensile strength of 12,000 psi.

TABLE 2

SUMMARY OF EPOXY INFILTRANTS

| Epoxy Resins | Rel. Density | MOR (psi) | Comments |
| --- | --- | --- | --- |
| RBC 3100 | 84.6 | 3700–5700 | Difficult to infiltrate |
| Duralco 4460 | 70.3 | 1600 | Easy to infiltrate |
| DER 331 | 80.3 | 2280 | Easy to infiltrate |
| Insulcast 771 | 74.7 | 2945 | Easy to infiltrate |
| CGL 1310 | — | 4000 | Difficult to infiltrate |
| LS 213-10 | 65.3 | 3961 | Difficult to infiltrate |

Generally, those resins that were judged "difficult to infiltrate" had higher molecular weights and viscosities, produced parts that had higher void volumes (lower relative densities) and higher bend strengths, MOR, (because the resin stayed on the outer surfaces of the bend bars) than resins that were judged easy to infiltrate. Part of this judgment was also based on the chemistry of the hardener, insofar as parts and initiated resin were usually heated to 60° C. to lower the viscosity of the resin. Heating, in several instances, greatly reduced the gel time which caused the resin to prematurely cease infiltrating the part. Resins that are suitable for infiltrating the oxidized iron bars include "DER 331" with 11.4% anhydride hardener ("DEH 24" anhydride sold by The Dow Chemical Company), "DER 331" with 41.2% nadic methyl anhydride and 0.55% benzyl dimethyl amine, "CGL 1310" resin with 18.7% hardener ("RP1520" sold be Ciba-Geigy), and "Insulcast 771" (Permagile Industries).

The preferred epoxy resin system for infiltration of air-fired parts is "DER 331" with 44.2% nadic methyl anhydride and 0.55% benzyl dimethyl amine. This system has a long gel time and a system viscosity near 40 centipoise at 80° C. (see *Dow Liquid Epoxy Resins*, Dow Chemical Co., 1990, p. 26; also see Advances in Anhydride Epoxy Systems, Anhydrides and Chemicals, Inc., 1991). Consequently it infiltrates more rapidly than it gels. The heat distortion or softening temperature of the cured epoxy resin system was measured to be 156° C. Its bending strength was measured in 3-point bending to be 14,000 psi, and its flexural modulus was determined to be 440,000 psi. All further references to the "DER 331" resin system are to this composition.

Parts can be infiltrated by a variety of techniques, including vacuum impregnation, painting surfaces of the part with resin, infiltration from the top (e.g., pouring resin on the top surfaces of the part), submersing the part in resin, or infiltrating from the bottom by capillary action. The part and catalyzed "DER 331" resin system are separately heated to 60° C. and 75° C., respectively, in an oven. The part is then placed in the pool of the resin, the temperature is maintained at 75° C., and the resin is allowed to soak into the part from the bottom. The height reached by the resin can be readily observed. For this particular resin, infiltration temperature, and part porosity (68%), approximately three hours are needed to ensure complete infiltration.

After infiltration, the part is removed from the resin and placed in a curing oven. The "DER 331" resin system infiltrated part is cured by heating and holding it at 100° C. for 2 hours, followed by post-curing at 150° C. for 6 hours.

EXAMPLE 8

Physical Properties

Three-point bend strengths of "DER 331" resins system-infiltrated and cured iron bars are compared with strengths of air-fired bars. The bars were shaped from mixed powder (40 volume percent binder) by selective laser sintering, and air-fired at 300° C. for 15 hours and at 450° C. for 4 hours. As discussed above, the strength of the bars that were air-fired at 450° C. is 2400 psi, a value that is substantially higher than the 1500 psi strength for bars that were air-fired at 300° C. Addition of the "DER 331" resin system substantially raises the strengths of both air-fired materials to 9500 psi and 5500 psi, respectively. Interestingly, the ratio of air-fired strengths and of infiltrated strengths are nearly the same, 1.6–1.7, indicating that improvements in strength of the metal oxide skeleton can give one for one improvements in the infiltrated and cured part. This ratio is substantially higher than would be predicted by the simple rule of mixtures that is normally used to predict composite strengths. The rule of mixtures predicted ratio of strengths, infiltrated/non-infiltrated, should not be much higher than 1.1–1.2 instead of observed ratios near 4. The reason for this behavior is not understood, but may be related to the formation of the metal/metal oxide skeleton.

Potential materials for use in fabricating molds that are used in the injection molding of thermoplastics must have thermal conductivities that are several times greater than the thermoplastic to facilitate removal of heat and solidification of the plastic melt. Most plastics materials, including epoxy resins, are poor conductors of heat and have thermal conductivities, K, near 0.2 W/m° C. The thermal conductivity of iron is typically between 46–83 W/m° C., while that for copper is approximately 420 W/m° C. The rule of mixtures can be employed to estimate the conductivity of the epoxy infiltrated materials discussed herein.

For example, a mixture of 0.38 volume fraction copper in epoxy should have a K between about 160 W/m° C. and 0.322 W/m° C. with the lower limit being more typical unless particle to particle contact (network formation) occurs. K for copper oxide, $Cu_2O$, is only 5.68 W/m° C. K for a mixture of 0.38 volume fraction copper oxide in epoxy should be bounded by 0.315 and 2.28 W/m° C. The observed value for a epoxy resin-infiltrated copper oxide structure is 0.79 W/m° C. Similarly, for an epoxy-infiltrated iron oxide structure with volume fraction iron oxide of 0.468 the thermal conductivity was 1.47 W/m° C. K for iron oxide, $Fe_3O_4$, is reported to be only 6.56 W/m° C., so that the calculated for the epoxy-infiltrated composite should lie between 3.18 and 0.37 W/m° C.

EXAMPLE 9

Construction and operation of a mold cavity insert for molding thermoplastics A mold insert slab, approximately 10 in×8.75 in×2.0 inch, and weighing approximately 7 Kg, was fabricated by mixing 40 volume percent PMMA/60 volume percent iron powder and consolidating the mixture in a rough mold at 125° C. for 2 hours. The slab was then post-processed in a manner similar to that described in Example 6 to remove the PMMA binder and to oxidize the iron powder. The slab was packed in alumina and placed in a temperature controlled oven with a nitrogen atmosphere. The slab was heated to 300° at 0.76° C./min, then heated at 0.5° C./min to 500° C. to completely remove the binder. The slab was then cooled, exposed to air, and reheated in an air atmosphere at 0.76° C./min to 300° C., where it was held for 8 hours to complete the oxidation process. The "DER 331" resin system, described in Example 7 above, was used to infiltrate the slab at 60° C. The resin was applied to the top surface of the heated slab with a paint brush until it would no longer infiltrate the slab. The resin was then cured at 150° C. for 6 hours.

Two smaller slabs (8.4 in×5.3 in×0.6 in) were cut and machined from the original infiltrated and oxidized slab with conventional machine tools. A four-axis milling machine (Bostomatic CNC) operated at 400 sfpm cutting speed and 5 imp feed rate, was used to machine the part cavity, runner, and ejector pin holes. The epoxy-infiltrated oxidized iron mold insert was then assembled to a standard mold base frame (Master Unit Die Products, Inc.) and ejector pin assembly. In keeping with the concept of prototype tooling, no ejector pin sleeves were installed in the mold insert, however the mating surfaces of the mold were ground flat to provide a good seal. Also, no attempt was made to polish the mold surfaces.

A 75 ton injection molding machine (Arburg) was used to evaluate the performance of the mold insert. Since no cooling channels were provided, the mold cooling time was set to 55 sec, a value that is about twice what is normally used when molding ⅛ in thick sections. A silicone-based release agent was applied to the mold surfaces. None of the parts stuck to the mold surfaces. The remaining molding conditions are summarized in Table 3. Four different materials were molded for a total of 176 shots. They were molded in the order given in Table 3, reading from the top.

Only 2 defects occurred during the 176 shot run. At shot 105, a hairline fracture started at one of the ejector pins and grew over the next 25 shots to a total length of approximately 1 inch. The crack did not propagate further and did not affect the performance of the mold, other than the faint mark left in the surface of the molded part. At shot 123, a small but noticeable chip of mold material that formed part of another ejector hole boundary broke away. This defect progressed through shot 127 to a total size near 1/16 inch×3/16 inch. This defect did not grow further. Thickness measurements on molded parts showed no measurable evidence of mold erosion during the 176 part run.

TABLE 3

MOLDING CONDITIONS

| Polymer | # of Shots | Peak Injection Pressure (psi) | Temperature (°C.) zones 1, 2, 3, & 4 | Injection Time (sec) |
| --- | --- | --- | --- | --- |
| ABS | 101 | 8000 | 200,190,200,200 | 3 |
| PMMA | 28 | 35000 | 175,170,160,160 | 3 |
| copolyester | 22 | 35000 | 275,275,275,275 | 4 |
| PC | 25 | 35000 | 245,275,300,300 | 4 |

What is claimed is:

1. A process for the manufacture of a mold useful for injection molding, comprising the sequential steps of:
   (a) forming a mixture of a metal powder and a polymer binder, and shaping the mixture to form a shape of the mold;
   (b) heating the mixture at a temperature in the range from about 100° C. to about 300° C. to remove a majority of the polymer binder from the mixture;
   (c) heating the mixture resulting from step (b) at a temperature greater than about 300° C. and less than the melting point of the metal in the presence of oxygen to oxidize at least a portion of the metal to form a self-adhering porous network of metal and oxidized metal;
   (d) contacting the porous network with an epoxy resin to fill at least a portion of the self-adhering porous network with epoxy resin; and
   (e) curing the body resulting from step (d) to form the mold that contains cured epoxy resin.

2. The process of claim 1, wherein the metal is iron, steel or copper.

3. The process of claim 1, wherein the mixture in step (a) contains from about 10 to about 40 percent by weight of polymer binder.

4. The process of claim 1, wherein the polymer binder contains styrene, methyl methacrylate, butyl acrylate or mixtures thereof.

5. The process of claim 1, wherein at least about 90 weight percent of polymer binder is removed during step (b).

6. The process of claim 1, wherein the epoxy resin has the following properties: is capable of at least a 3 centimeter capillary rise on the porous network and has a viscosity of about 40 centipoise at 80° C.; and the cured epoxy resin has the following properties: a softening temperature greater than 150° C. and has a tensile strength of about 10,000 psi.

7. The process of claim 1, wherein in step (d) the epoxy resin is present in a volume sufficient to fill greater than about 95 percent of the void space in the self-adhering porous network.

8. The process of claim 1, wherein in step (e) the curing is conducted at a temperature of from about 50° C. to about 200° C.

9. The process of claim 1, wherein step (c) is conducted such that greater than about 5 percent and less than about 95 percent of the metal is oxidized, based on the total amount of metal present.

10. A process for the manufacture of a mold useful for injection molding, comprising the sequential steps of:
    (a) forming a mixture of a metal powder and a polymer binder, and shaping the mixture to form a shape of the mold;
    (b) heating the mixture at a temperature in the range from about 100° C. to about 300° C. to remove a majority of the polymer binder from the mixture;
    (c) heating the mixture resulting from step (b) at a temperature greater than about 300° C. and less than the melting point of the metal in the presence of oxygen to oxidize at least a portion of the metal to form a self-adhering porous network of metal and oxidized metal;
    (d) contacting the porous network with an epoxy resin to fill at least a portion of the self-adhering porous network with epoxy resin; and
    (e) curing the body resulting from step (d) to form the mold that contains cured epoxy resin, wherein the mold is composed of greater than about 10 volume percent and less than about 90 volume percent of the epoxy resin.

11. A process for the manufacture of a mold useful for injection molding, comprising the sequential steps of:
    (a) forming a mixture of a metal powder and a polymer binder, and shaping the mixture by selective laser sintering to form a shape of the mold;
    (b) heating the mixture at a temperature in the range from about 100° C. to about 300° C. to remove a majority of the polymer binder from the mixture;
    (c) heating the mixture resulting from step (b) at a temperature greater than about 300° C. and less than the melting point of the metal in the presence of oxygen to oxidize at least a portion of the metal to form a self-adhering porous network of metal and oxidized metal;
    (d) contacting the porous network with an epoxy resin to fill at least a portion of the self-adhering porous network with epoxy resin; and
    (e) curing the body resulting from step (d) to form the mold that contains cured epoxy resin.

* * * * *